(12) United States Patent
Wyseur

(10) Patent No.: US 11,936,643 B2
(45) Date of Patent: Mar. 19, 2024

(54) SENDING AND RECEIVING MESSAGES

(71) Applicant: NAGRAVISION SARL, Cheseaux-sur-Lausanne (CH)

(72) Inventor: Brecht Wyseur, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 316 days.

(21) Appl. No.: 17/270,556

(22) PCT Filed: Aug. 14, 2019

(86) PCT No.: PCT/EP2019/071784
§ 371 (c)(1),
(2) Date: Feb. 23, 2021

(87) PCT Pub. No.: WO2020/038789
PCT Pub. Date: Feb. 27, 2020

(65) Prior Publication Data
US 2021/0258297 A1    Aug. 19, 2021

(30) Foreign Application Priority Data
Aug. 24, 2018  (EP) ..................... 18190859

(51) Int. Cl.
*H04L 29/06* (2006.01)
*H04L 9/32* (2006.01)
*H04L 9/40* (2022.01)

(52) U.S. Cl.
CPC .......... *H04L 63/083* (2013.01); *H04L 9/3242* (2013.01); *H04L 2209/043* (2013.01)

(58) Field of Classification Search
CPC ................. H04L 63/083; H04L 9/3242; H04L 2209/043; H04L 63/123
(Continued)

(56) References Cited

U.S. PATENT DOCUMENTS 7,461,266 B2 * 12/2008 Chou ................. G06F 12/1433
                                                                    713/186
9,705,678 B1    7/2017 Wang
(Continued)

FOREIGN PATENT DOCUMENTS

| CN | 108174360 A | 6/2018 |
| EP | 1 850 256 A1 | 10/2007 |
| WO | 2015/170453 A1 | 11/2015 |

OTHER PUBLICATIONS

Design of Message Validation Method in HL7 Medical Information System, Wang et al, May 2018 (Year: 2018).*
(Continued)

*Primary Examiner* — Jahangir Kabir
(74) *Attorney, Agent, or Firm* — POLSINELLI LLP

(57) ABSTRACT

The present disclosure relates to the exchange of information between a message sending device and a message receiving device with message authentication and proposes to reduce the time required for message authentication by pre-computing a message tag, such as a MAC, and subsequently replacing the computation of the MAC when the tag is to be validated (or indeed also on sending) by a table look-up. The approach requires a set of messages and works particularly well for small sets of messages, for example as small as two or three messages, or less than five or ten messages. The approach finds particular application in control networks where control decisions have to be taken quickly and securely, for example in the control of a vehicle, for example an autonomous vehicle, or the control of a smart electricity grid.

18 Claims, 6 Drawing Sheets

(58) Field of Classification Search
USPC .......................................................... 726/6
See application file for complete search history.

(56) References Cited

U.S. PATENT DOCUMENTS

2010/0145951 A1* 6/2010 Van Coeverden De Groot ..........
  H04L 63/123
  707/747
2016/0248588 A1  8/2016 Langhammer
2016/0297401 A1  10/2016 Haga et al.

OTHER PUBLICATIONS

International Search Report and Written Opinion dated Jul. 17, 2019 for International PCT Application No. PCT/EP2019/071784; 9 pages.
European Search Report dated Feb. 5, 2019 for European Patent Application No. 18190859.1; 7 pages.

* cited by examiner

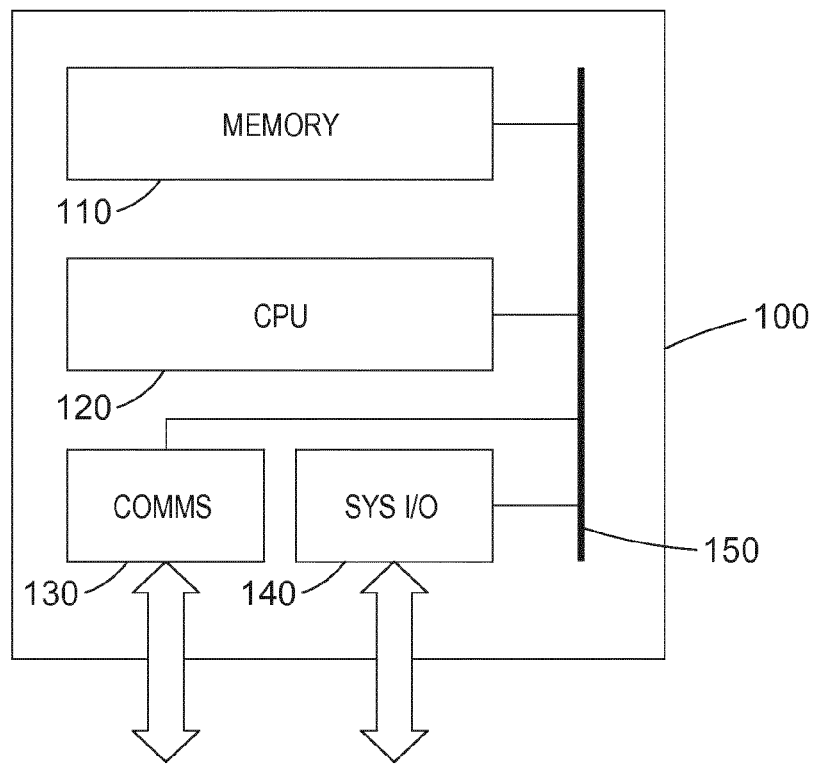
Fig. 1
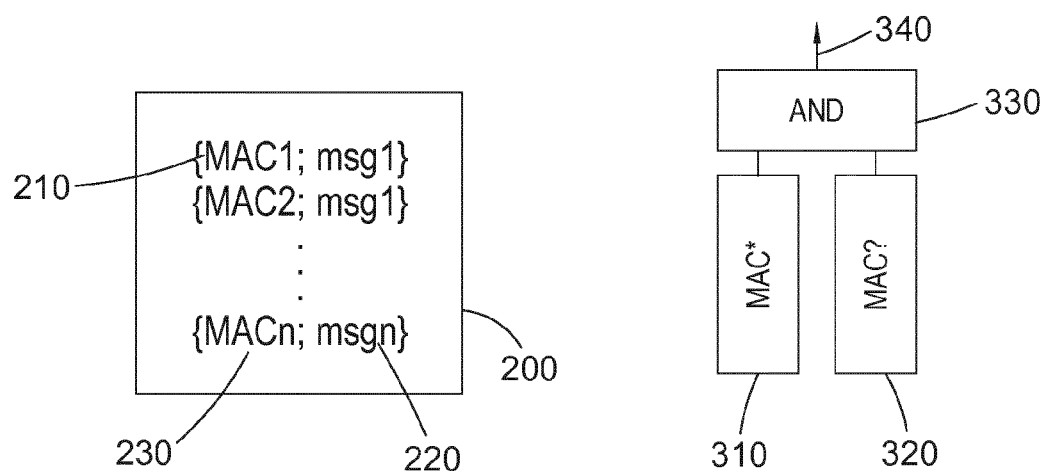
Fig. 2
Fig. 3

SENDING AND RECEIVING MESSAGES

CROSS-REFERENCES TO RELATED APPLICATIONS

This application is a U.S. National Stage of PCT Application No. PCT/EP2019/071784, filed Aug. 14, 2019, which claims the priority benefit of European Patent Application No. 18190859.1, filed on Aug. 24, 2018, both of which are incorporated herein by reference in their entirety for all purposes.

FIELD

The present disclosure relates to the receiving and sending of messages, in particular, although not exclusively, to the secure and efficient exchange of messages in a control network enabling secure, reliable control.

BACKGROUND

In many digital operations implemented over a communications network, fast decision making is of utmost importance. For example, in autonomous driving immediate action may be needed based on events such as detection of an obstacle on the road or responding to brake pedal being pushed. In Smart Grid applications, substations are automated and need to act upon events to avoid power outage. Decisions need to be taken as fast as possible to ensure safe operation. To guarantee correct decision making, the source of information upon which a decision is made has to be authenticated. Else, adversaries can send false data and force wrong decision making, which can lead to unsafe operation. This is the case whenever outside access to the communications network is possible, whether the network is the Internet, a dedicated closed network that can be compromised, or the like. However, authenticating data and verifying the authenticity takes additional time since extra computing needs to be done. It follows that the requirement for security of communications can in some circumstances compete with the requirement for timeliness of the information and/or action taken in response to it.

Message authentication can be based on digital signatures using asymmetric encryption, or on a common shared symmetric key that is used to compute a message tag, known as a Message Authentication Code (MAC). In the latter approach, the MAC is exchanged together with a message, enabling the receiver of the message to compute the MAC using the shared key and a shared algorithm, such as Cipher-based MAC (CMAC), Hash-based MAC (HMAC), SipHash and the like, used to calculate the MAC. By comparing the received and computed MAC, the message can be validated as authentic if the received and computed MAC match.

BRIEF DESCRIPTION OF THE DRAWINGS

FIG. 1 illustrates a communication device;
FIG. 2 illustrates a data structure;
FIG. 3 illustrates a hardware implementation of a data structure.

DETAILED DESCRIPTION OF THE DRAWINGS

Figure 4:
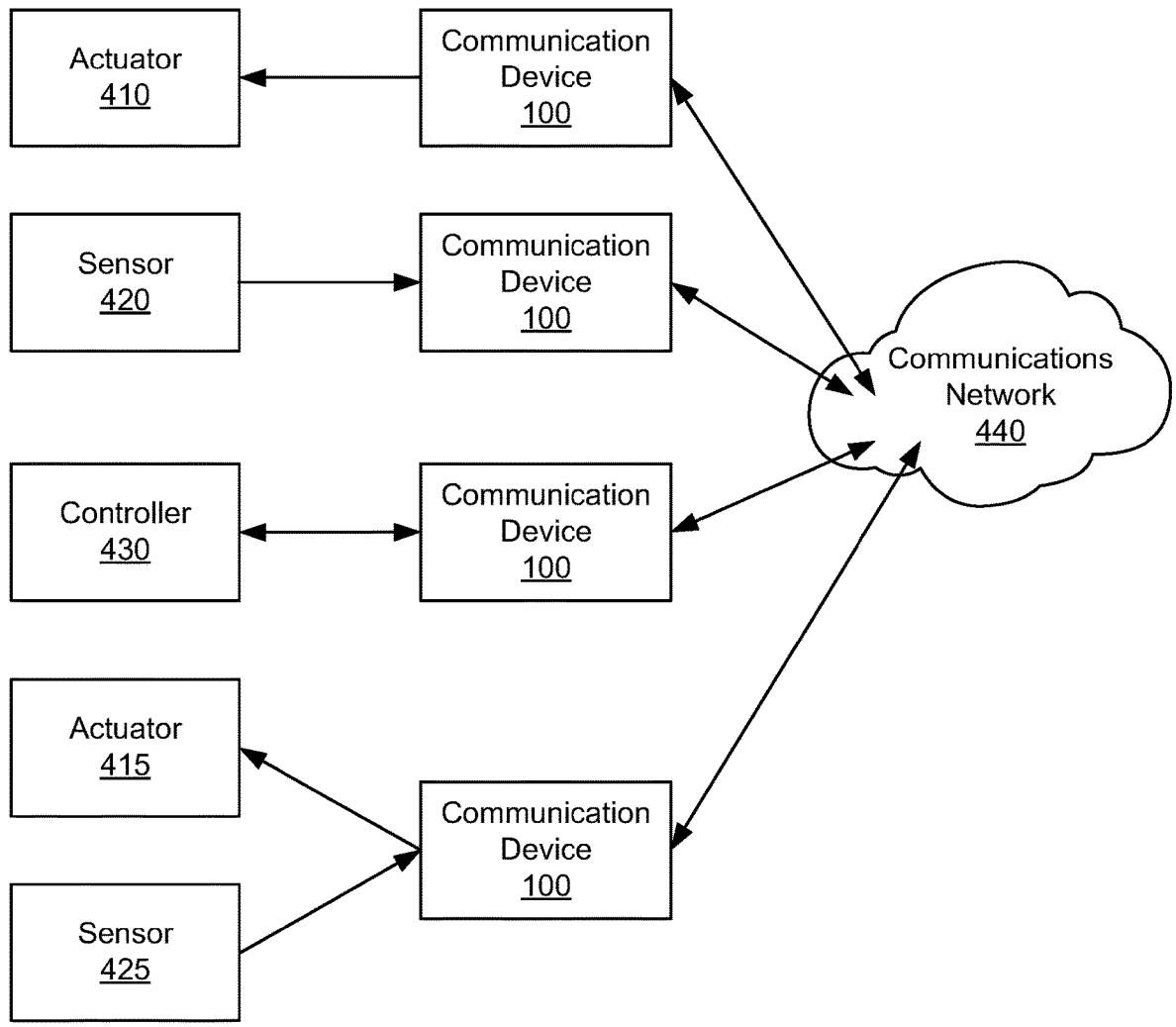
FIG. 4 illustrates a distributed control system.

In overview, the present disclosure reduces the time required for message authentication and validation by pre-computing a message tag, such as a MAC, and subsequently replacing the computation of the MAC when the tag is to be validated (or indeed also on authentication and sending) by a table look-up, which is computationally much less intensive than the MAC computation. This approach requires a known set of messages and works particularly well for small sets of messages, for example as small as two or three messages, or less than five or ten messages.

In a first aspect, a message receiving device comprises a memory configured to store a set of messages and corresponding message tags; a communications interface configured to receive a message tag from a message sending device and a processor. The processor is configured to combine each message with an authentication key to generate a corresponding message tag. Generating the message tags may comprise encrypting the message with the authentication key, hashing the message with the authentication key or applying any suitable MAC algorithm using the authentication key in combination with the message, as a seed, parameter, or the like. The MAC algorithm may be CMAC, HMAC or SipHash, for example. The processor is further configured to store each computed message tag in the memory. Subsequently, the processor can compare a received message tag with the stored computed message tags to identify a matching message tag, thereby validating the received message tag as one of the set.

The set of messages may be predefined in a fixed manner, for example a fixed set of possible control or sensor values to be transmitted. Of course, such a fixed set may change from time to time. The set of messages may instead be predetermined dynamically, that is vary over time in a predefined manner, for example so that a small set of possible values can be predicted when communication occurs, for example by consulting a reference common to the sender and transmitter. A sufficient condition on the accuracy of the prediction is that the plurality of values at the sender and transmitter have at least the transmitted value in common to enable the tag for the transmitted value to be recognised. Examples of such values may be dates, times, clock ticks, coordinates close to each other and the like.

The authentication key may be computed using a Key Derivation Function. The key derivation function may operate on a secret state, which is shared between the message sending and receiving devices, and public information available to or exchanged between the message sending and receiving devices, for example a time datum or all or part of an exchanged message, such as the message to be communicated by the sending device or a return message returned by the receiving device. The secret state may be a fixed secret shared key, a counter, a combination of a fixed key and a counter or an otherwise incremented key, the last authentication key or any other secret state that can be maintained in sync between the message sending and receiving devices. The KDF may be KDF1, HKDF, a password hashing function, a linear feedback shift register, a KDF as recommended in NIST Special Publication 800-108 or any other suitable KDF.

The memory may be a general purpose random access memory, a dedicated direct access memory storing the messages/tags at dedicated memory addresses or be comprised of a dedicated register or registers for storing the messages and tags, providing access speed benefits. Processing speeds of later tag comparison may be increased in embodiments in which each message tag is stored in a corresponding register and the subsequent comparison with a received tag is parallelised using respective threads, circuits or processors.

Typically, each tag is stored in the memory associated with its corresponding message as a pair, so that a received message can be validated, or a message can be identified by looking up the received tag in the memory. In the former case the receiving device can check that the received message and tag match based on a table look-up in the memory and in the latter case the received tag can be used to identify the message communicated by the sender without receiving the message itself. However, in some embodiments, a message is received together with the tag, but the tag is used only to check that it is present in the memory, that is authenticating the message as one of the set, rather than confirming its identity within the set. In these embodiments, the messages and tags need not be stored as pairs and, indeed, it is sufficient to store the tags as a list.

The message tag may be received on it own, without the message, or the message tag and message may be received together. In the latter case, the message may be received in encrypted form and may be decrypted for use. Comparison with messages in the memory, if applicable, may be implemented using the message in encrypted or decrypted form, with the stored message configured accordingly. The message may be encrypted together with a nonce, in which case each message tag is computed for the combination of the nonce and message. Naturally, the message may be received in clear text. It will be appreciated that encryption/decryption is obviated in embodiments where the message is not sent itself.

The processor is further configured to, in response to a trigger event, for example the validating of the tag, update the authentication key, to combine each message with the updated authentication key to update the corresponding message tag and to store the updated message tags in the memory, for example in association with the corresponding message or not, as the case may be. The key update may occur on each communication to reduce the possibilities for attack or may occur less frequently. If the update is triggered based on communications, for example every communication or successful validation, the process may be configured to transmit a return (acknowledgement) message to the sending device when updating the key, whether in response to validating the tag or more generally in response to receipt of the tags), to ensure the authentication keys are kept in sync. For increased security, the return message may comprise authentication information enabling its validation at the message sending device to make an attack on the key synchronisation between the sending and receiving device more difficult. In other embodiments, the trigger event may be a certain time datum or the passage of a time interval since the last update, in which case the receiving and sending devices may have access to a common or respective synchronised sources of time information, such as a time server or accurate clocks.

The message receiving device may be part of a control system in which the exchange of message may trigger control actions at the message sending device or at the message receiving device, for example the triggering of a brake action in response to a pedal actuation or the detection of an obstacle in a vehicle, for example an autonomous vehicle, or the control of substations and/or local loads in households in a smart electricity grid in response to measured consumption in a plurality of households. Other application examples include Internet of Things control application, industrial control systems, in particular with components communicating over a public network, industrial plant control systems such as control systems for chemical plants, robotic factories, nuclear reactors and the like. For example, in some embodiments, the return message may comprise a control instruction for an actuator device associated with the message sending device and/or each message originating at the sending device comprises a corresponding control instruction for an actuator device associated with the message receiving device. In some embodiments, each message originating at the message sending device comprises corresponding sensor information, for example a quantised sensor value or binary value, from a sensor associated with the message sending device. A control action of the receiving device may also or instead be based on a received sensor value.

In a second aspect, a message sending device comprises a memory configured to store a plurality of pairs of respective messages and corresponding message tags; a communications interface configured to transmit message tags; and a processor. The processor is configured to combine each message with an authentication key to generate a corresponding message tag and to store each computed message tag in the memory in association with the corresponding message as a pair. The processor is further configured to select a message to communicate to a message receiving device, for example in response to receiving an instruction to transmit a particular message, in response to a sensor signal or interrupt or in response to a computation based on an input signal, such as sensor signal, and to retrieve the message tag corresponding to the message from the memory. The processor then causes the communications interface to transmit the retrieved message tag corresponding to the selected message, together with or without the message itself.

In order to reduce vulnerability to attack, the processor is configured to, in response to a trigger event, update the authentication key, to combine each message with the updated authentication key to update the corresponding message tag and to store the updated corresponding message tag in the memory in association with each message. In some embodiments, the communications interface is configured to receive a return message from the message receiving device, wherein the trigger event comprises the receipt, by the communications interface, of a message confirming receipt of the message tag by the message receiving device. The message may comprise authentication information allowing the message confirming receipt to be validated and the trigger event may comprise the successful validation of the return message.

It will be appreciated that the message receiving device may also comprise the components and functions of the message sending device and vice versa and that, hence, a message sending and receiving device may be referred to as a message receiving device if or when it functions to receive messages and as a message sending device if or when it sends messages.

In a third aspect, a control system comprises a message receiving device and a message sending device as disclosed above, with one or both of the message sending device and the message receiving device being associated with an actuator device to be controlled. In some embodiments, the control system may comprise pairs of message sending and receiving devices, each pair located at a respective location or serving a respective function. In such embodiments, the devices of each pair may share components, for example one or more of the processor, communications interface or memory and indeed may be provided as a single device implementing the functions of both the message sending and message receiving devices. More generally, in any of the aspects disclosed, the communications interface may comprise separate receiver and transmitter components, for example separate devices or may be provided in any suitable form as a single or several modules of a device. It will be understood that the described components and their functions may be implemented in any combination of modules and that this disclosure is not limited to any particular combination of or distribution between modules of the described components and functions and that any such modules may be implemented in software, hardware or a combination thereof.

In a fourth aspect, a method of receiving a message comprises combining each of a plurality of messages with an authentication key to generate a corresponding message tag and storing the plurality of messages and corresponding message tags. The method then comprises receiving a message tag from a message sending device and comparing the received message tag with the stored computed message tags to identify a matching message tag, thereby validating the received message tag. The method further comprises, in response to a trigger event, updating the authentication key, combining each message with the updated authentication key to update the corresponding message tag and storing the updated message tag in the memory. In some embodiments, each computed message is stored in the memory in association with the corresponding message as a pair. As a result, the method may comprise, in response to identifying the matching message tag, identifying the corresponding message, thereby identifying the message communicated by the sending device without receiving the message. Equally, in some embodiments, the message is received also, enabling validation of the authenticity of the message by comparing the received pair of message and message tag with the stored pair.

Embodiments of the fourth aspect further extend to methods implemented by a message receiving device as disclosed above and a fifth aspect of the disclosure extends to a method as implemented by the message sending device disclosed above with embodiments of the fifth aspect corresponding to methods implemented by the disclosed embodiments of the message sending device. A sixth aspect extends to a method implemented by the control system of the third aspect, as disclosed above, with corresponding embodiments corresponding to methods implemented by embodiments of the control system.

It can be noted that all aspects combine a table look up to validate a message tag with periodic updating of stored message tags using an updated key in order to reduce vulnerability to attack. In some embodiments of any of the disclosed aspects, the updating of the key and stored message tags happens asynchronously, that is at a different time than the validating of the message tag and any decision or control action based on the received message. In this way, the reaction time of the system is limited by the (fast) look-up of the message tag for validation and not by the (potentially slower) key update and updating of stored tags.

Some specific embodiments are now described with reference to the accompanying drawings, by way of example, to illustrate aspects of the disclosure. With reference to FIG. 1, a message sending and receiving device 100 comprises a memory, such as solid state memory, FLASH memory, hard drive, volatile memory, RAM or any other type of suitable memory to store data, a processor 120, for example a CPU, microprocessor, set of microprocessors, with or without co-processors and hardware acceleration circuits, a communications interface 130 able to send and receive data, for example messages and message tags, and a system interface 140 to interface with system components to be controlled in response to received data or messages processed by the processor 120. In some embodiments in which the device 100 has no control function, the system interface 140 is not present. In some embodiments, the system interface 140 is configured to receive sensor data from other system components and the processor 120 is configured to generate or select messages to be sent based on the sensor data. In some embodiments, the system interface is configured to both send control data and receive sensor data. The described components are in communication with each other via a data bus 150.

In some embodiments, the device 100 only sends or only receives messages, in which case the communications interface 130 may be configured as only a receiver or only a sender, although even in those embodiments acknowledgement messages may be sent and received, so that a bi-directional communications interface is still required. The communications interface may be referred to as a receiver when receiving and as a sender when sending, so that the receiver may be one and the same component or a sender and receiver may be implemented in respective separate components to form the communications interface.

With reference to FIG. 2, a data structure 200 is stored in the memory 110 and comprises pairs 210 of messages 220 and message tags 230 corresponding to each message, for example a MAC computed for each message 220. The messages 220 and message tags 230 are stored as pairs, enabling a message to be retried from the data structure by a table look-up for the message tag 230 as a key to the message 220 and vice versa. The messages 220 are a set of possible messages that the device 100 may send or receive, so that the data structure 200 may be of fixed size.

The set of messages may be fixed and may correspond, for example, to a set of control commands or sensor values to be transmitted. Alternatively, the set of messages may change over time in a predictable manner, so that both sender and receiver can have a shared set of messages 220 and message tags 230, for example deriving the set using a common reference such as a common time reference. A particular example relates to clock signals in a GPS system in which GPS signals are transmitted using messages 220 and message tags 230.

In one specific embodiment, the memory structure 200 is implemented in specific hardware, rather than in general purpose memory, for example an arrangement of registers 310, one for each message tag 230 and a respective register 320 for a received message tag. Each pair of registers 310, 320 is linked by an AND gate 330 to produce a logical TRUE output for the pair of registers where there is a match between the received and stored message tags 230. A corresponding register for each register 310 may be loaded with the corresponding message, thereby enabling parallelised identification of the corresponding message based on the output 340 of the AND gates 330. Equally, the circuit may be arranged to perform the AND operation on pairs the stored messages 220 and the received message or the stored pairs 210 and the received pair of a received message and message tag.

With reference to FIG. 4, a distributed control system may comprise a plurality of communication devices 100 connected to other respective system components, for example an actuator 410 to be controlled in response to a received message as a sensor 420 to generate data as the basis of a message to be sent in order to control a remote actuator 410 by sending sensor data or control commands based on sensor data. In some instances, a communications device may be coupled to both an actuator 415 and a sensor 425 in a single device or over a local connection, to send sensor data and receive control commands from a remote controller 430. The remote controller 430 is coupled to a device 100 to receive sensor data and return control commands. The actuators 410, 415, sensors 420, 425 and controller 430 communicate, via the respective devices 100 on a communications network 440, for example the internet. Although FIG. 4 illustrates the control system with one of each type of device 410, 415, 425 and 430, it will be appreciated that the disclosure is not limited to any particular number of such devices, nor indeed the presence of devices of all types.

Figure 5:
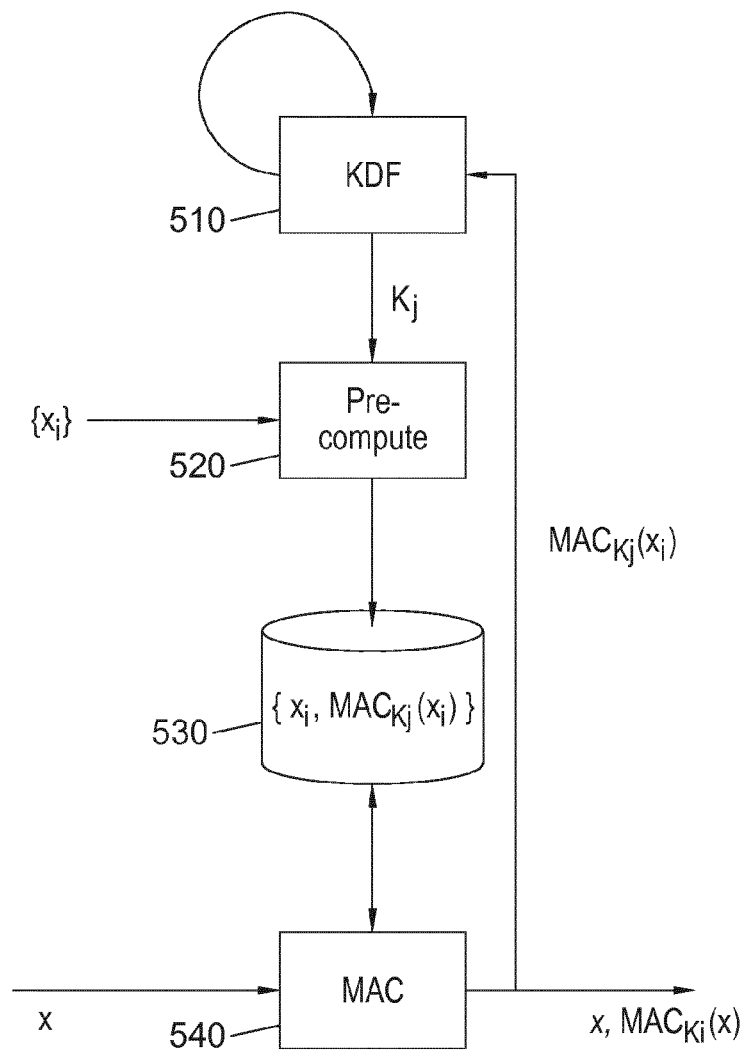
FIG. 5 illustrates modules configured to authenticate a message.

With reference to FIG. 5, operation of the device 100 as a sending device, specifically in respect of the generation and use of message tags, is now described in terms of functional modules. It will be appreciated that these functional modules may be distributed between the components of the device 100 in any suitable way. As discussed above, the data structure 200 stores pairs 210 of messages 220 and message tags 230. The message tag 230 for a message 220, xi, of a set of messages {xi} is pre-computed by combining each xi with a current authentication key Kj to generate as a message tag 230 a MAC MAC_Kj(xi), using for example any of the MAC algorithms discussed above. It will be appreciated that message tag 230 may be computed using any suitable algorithm combining xi and Kj to provide a tag that can be used to authenticate and/or identify xi. The current Kj is computed by a KDF 510 having a secret internal state that is derived from or combined with potentially public update data to produce an updated Kj+1 in response to a trigger event. The trigger event may comprise one or more of the lapse of a certain time since a last update of Kj, a time stamp or datum, the sending of a message, the receipt an acknowledgment of the message having been received by the addressee or the authentication of the acknowledgement message. Any suitable KDF, for example as described above may be used.

A pre-compute module 520 receives {xi} and Kj and computes pairs {xi, Mac_Kj(xi)}, which are stored in a database 530, for example in memory 110 in accordance with data structure 200. It will be appreciated that in any embodiments where an association between messages 220 and message tags 230 is not needed, for example because validation of a tag as any one of the sets of tags is sufficient, the tags and messages may be stored not as pairs but independently without mutual association. An authentication module 540 receives a message x to be sent (or an indication or index of such a message) and accesses the database 530 to retrieve MAC_Kj(x) and to pass the pair x, MAC_Kj(x) to the communications interface for sending. In some embodiments only MAC_Kj(x) may be passed to the communications interface for sending. In some embodiments, MAC_Kj(x) may also be passed to the KDF 510 as update data to enable Kj to be updated in response to the trigger event. Any suitable MAC algorithm or other algorithm for computing the message tag 230, e.g. MAC_Kj, from the message 220, e.g. x, and Kj, for example as described above, may be used.

Figure 6:
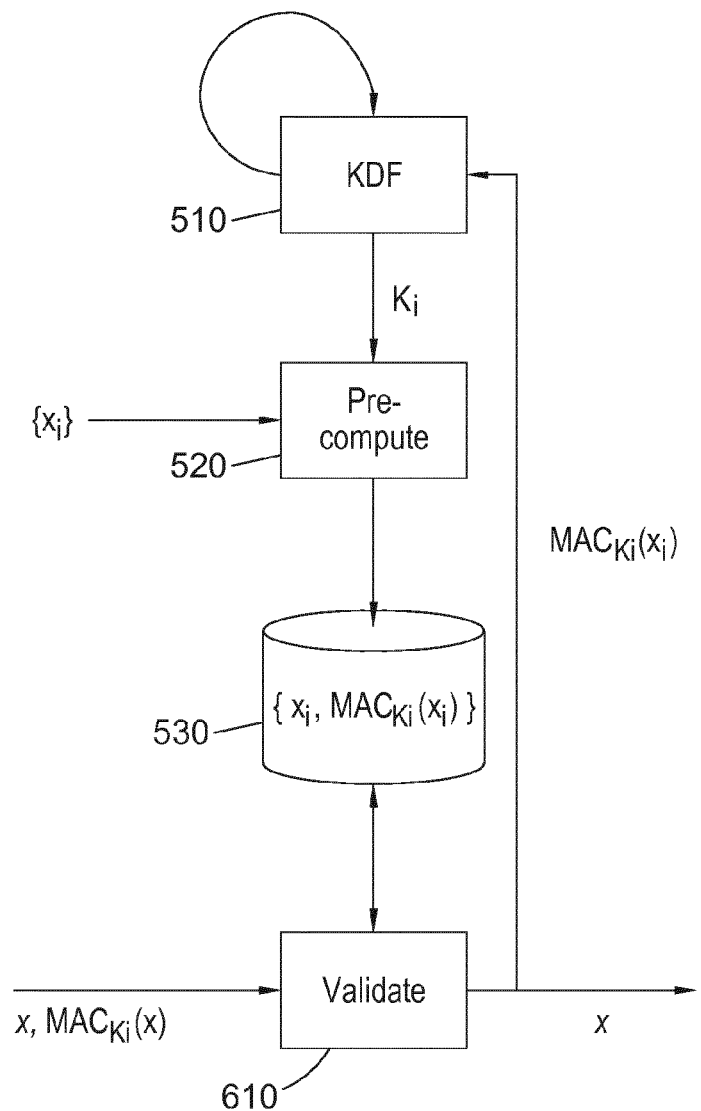
FIG. 6 illustrates modules configured to validate authentication.

With reference to FIG. 6, operation of the device 100 as a receiving device, specifically in respect of the verification of message tags, is now described in terms of functional modules. Modules 510, 520 and 530 may be the same or separate instances of the same modules as described with reference to FIG. 5 above, safe for the trigger event to trigger an update of Ki, which may comprise one or more of the lapse of a certain time since a last update of Kj, a time stamp or datum, the receiving of a message, the sending of an acknowledgment of the message having been received, the validation of a received MAC_Kj(x) or of a received pair x, MAC_Kj(x). It will be appreciated that some of these triggers are overlapping, i.e. the validation of the authenticating of x, MAC_Kj(x) necessarily includes the validation of MAX_Kj(x), at least implicitly and both at least implicitly include receiving x, MAC_Kj(x) in the first place. In other words, the trigger event "validation of x, MAC_Kj(x)" comprises the trigger event "validation of MAC_Kj(x)", but the trigger event "receipt of x, MAC_Kj(x)" comprises none of these as a necessity.

In contrast to the sending device (or device 100 in sending mode) described above with reference to FIG. 5, a receiving device (or device 100 in receiving mode) is now described with reference to FIG. 6 and comprises a validation module 610 in place of the authentication module 540. The validation module 610 receives x, MAC_Kj(x) and performs one of the following functions: a) look up MAC_Kj(x) in the database 530 and, if present, retrieve x to compare to the received x thereby authenticating x if there is a match; b) look up x in the database 530 and, if present, retrieve MAC_Kj(x) and compare with the received MAC_Kj(x) thereby validating authenticating of x if there is match; c) look up the received x, MAC_Kj(x) in the database 530 to find a match, thereby validating authenticating of x; and d) look up MAC_Kj(x) in the database to validate the received MAC_Kj(x) as one of the valid MAC_Kj(x), thereby providing a lesser form of authentication. Note that all four operations validate MAC_Kj(x) to an extent. The latter case is useful in embodiments where only MAC_Kj(x) and not x is sent and received. In these embodiments, the match of MAC_Kj(x) is used to retrieve x from the database 530. In any event, if MAC_Kj(x) is validated and hence x is at least to some extent validated, or identified and retrieved, x is passed on to other components in the device 100, for example the system interface 140 to trigger a control action in the system associated with the device 100, for example activating a brake of a vehicle or throttling or switching off electricity consumption in a household.

In a connected system of at least two devices 100 (or at least one sending device and at least one receiving device), Kj must be shared between the devices while remaining a secret between the device and the resulting set of pairs {xi, Mac_Kj(xi)} (pairs 210 of messages 220 and message tags 230 in data structure 200) must be kept in synchronisation between devices to the extent that Kj is in sync at the time a message needs to be exchanged, with lee-way Kj to be out of sync between devices at other times. This enables the computation and storage of the pairs to be executed asynchronously at a different time from the validation of a received message tag 230 and subsequent action, so that the synchronisation and updating of the pairs does not interfere with rapid actioning of a received message.

Figure 7:
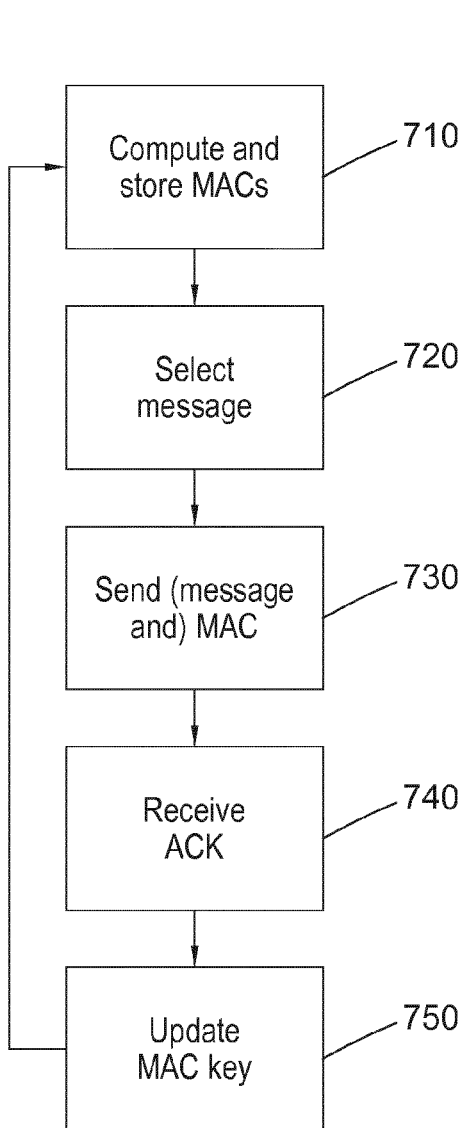
FIG. 7 illustrates a method of sending a message tag authenticating a message.

With reference to FIG. 7, a method of sending a message by a sender, for example using the device and/or modules described above, comprises a step 710 of computing and storing message tags 230 for a set of messages 220 in a database 530, for example having a data structure 200. In some embodiments, the messages 220 and tags 230 are stored in association with each other as pairs 210. The message tags 230 are computed by combining each message 220 with an authentication key, for example Kj, to generate a corresponding tag 230. Typically, the authentication key is a single key value that is combined with each of the messages 220. In some embodiments the authentication key comprises a set of key values, for example one for each message 220, and combining the messages 220 with the authentication key comprises combining each message 220 with a respective key value of the authentication key. The key and messages 220 may be combined in any suitable way, for example using a cryptographic operation or more specifically a MAC algorithm such as described above. Step 710 is executed in advance, for example in a set-up or boot routine of the device, in some embodiment in coordination with other device(s) the device sending the message is communicating with. In any event, the devices in communication are set up so as to share the authentication key as a secret and have corresponding message 220 and message tag 230 pairs 210 stored by the time communication between devices is required.

At step 720, when a message 220 is to be sent, the message is selected, for example based on a sensor input that is linked to a corresponding set of discrete messages, each associated with a sensor output value or set of values, or, in other embodiments, based on an operator input. A corresponding message tag 230 is retrieved from memory ready for sending. At step 730 the message tag 230 is sent to a recipient receiver. In some embodiments, the message 220 is sent together with the message tag so that its authenticity can be validated by the recipient and in other embodiments, the message 220 is not sent and the recipient can recover the message from the received message tag 230 and stored pairs 210 associating messages 220 with message tags 230.

At a later time, at step 740, an acknowledgement message is received confirming that the sent message tag 230 has been received and, in some embodiments validated. The acknowledgement message may in some embodiments comprise information enabling the acknowledgement message to be authenticated, such as a digital signature or MAC. Since the authentication of the acknowledgement (or other return) message can be done asynchronously without affecting the time-critical sending/validation and actioning processes, it is not critical that this authentication is particularly fast, enabling the use of conventional authentication method. However, in some embodiments, the acknowledgement message is part of the data structure 200 of messages and is processed by the sender using the disclosed techniques for rapid processing of messages, in effect acting as a receiver as disclosed above and implementing the receiving method discussed below but typically omitting the step of returning an acknowledgement of the acknowledgement.

Figure 8:
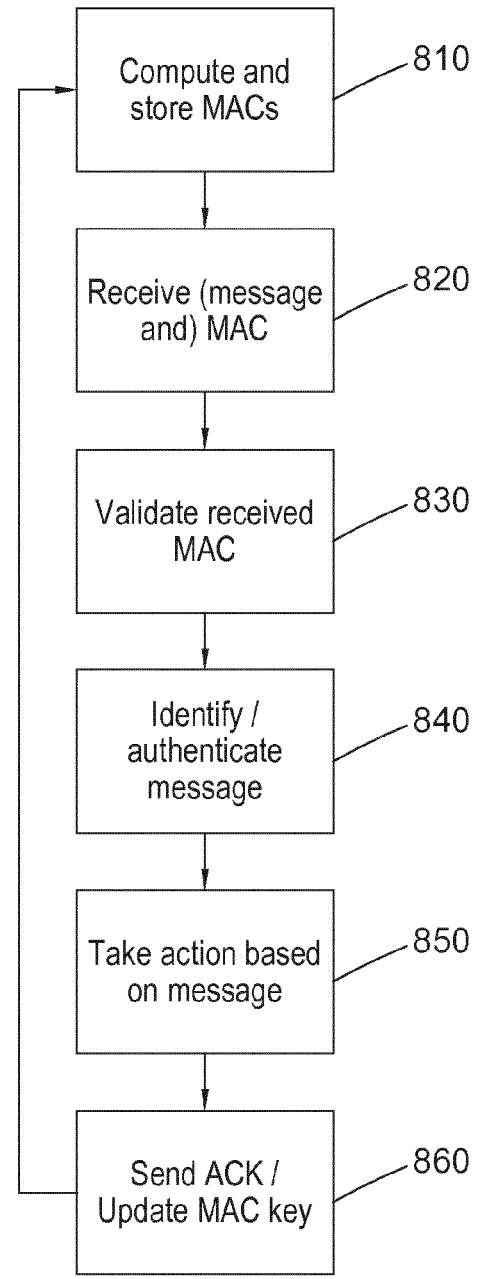
FIG. 8 illustrates a method of receiving and validating a message tag and taking an action.

With reference to FIG. 8, a method of receiving a message, for example using the device and/or modules described above, comprises a step 810 of computing and storing message tags 230 for a set of messages 220 in a database 530, for example having a data structure 200. Step 810 is the same as step 710 but executed at a receiver device in communication with the sender implementing step 710 to receive a message tag 230 from the sender. At step 820, a message tag 230 sent at step 730 discussed above is received, in some embodiments together with the corresponding message 220. At step 830 the message tag 230 is validated by a table look-up, for example as described above. If the message tag is successfully validated the corresponding message 230, if received, is of considered to be of validated authenticity or, if the message 230 is not received, is identified in the data structure 220, as described above, at step 840. Steps 830 and 840 may be combined, for example, the received message 220 may be used in a table-look up, the tag 230 retrieved and compared to the received tag 230, or the pair 210 of message 220 and tag 230 may be looked up.

If the message 220 intended to be communicated by the sender has been identified or the received message 220 has been validated, an action is taken based on the message 220 at step 850. In some embodiments the message 220 comprises a control instruction for an actuator associated with the receiver and, in response to step 840, the control instruction is processed, and the actuator is caused to implement the instruction, for example by sending actuator commands over the system interface 140. In some embodiments the message 220 comprises a sensor signal, indicative of a sensor reading at the sender, and the sensor reading is processed to determine an instruction for action to be taken in response to the sensor reading, following which the actuator is caused to implement the instruction, for example as described above.

At step 860, in some embodiments after the instructions has been sent to the actuator or has been actioned, a return message such as an acknowledgement message is sent back to the sender of the message tag 230. This has the advantage that the corresponding action can be taken without delay. In some embodiments, the return message is sent directly after the received message tag 230 has been validated. Additionally, the authentication key is updated at step 860 as described above, for example with reference to step 750 illustrated in FIG. 7. The key update may be done in between completed execution of the instruction and sending of the return message or after sending the return message, for example.

After both of steps 750 and 860 have been completed and the receiver and sender thus both have a new shared and secret authentication key, each process returns to updating the pairs 210 of messages 220 and message tags 230 of data structure 200, for example in the database 530 (step 710 and 810, respectively) for a new cycle of sending and receiving messages. The process thus combines quick validation of authenticity and/or identification of exchanged messages based on a table look-up and, in some embodiments, enables the use of slower key update, data structure update and acknowledgement or other synchronisation steps without detriment to the quick validation or identification of messages, and their execution.

A specific hardware implementation of a device 100 has been disclosed above but it will be appreciated that many other implementations are possible according to different embodiments, including different dedicated computing devices and circuits and general-purpose computing devices.

Figure 9:
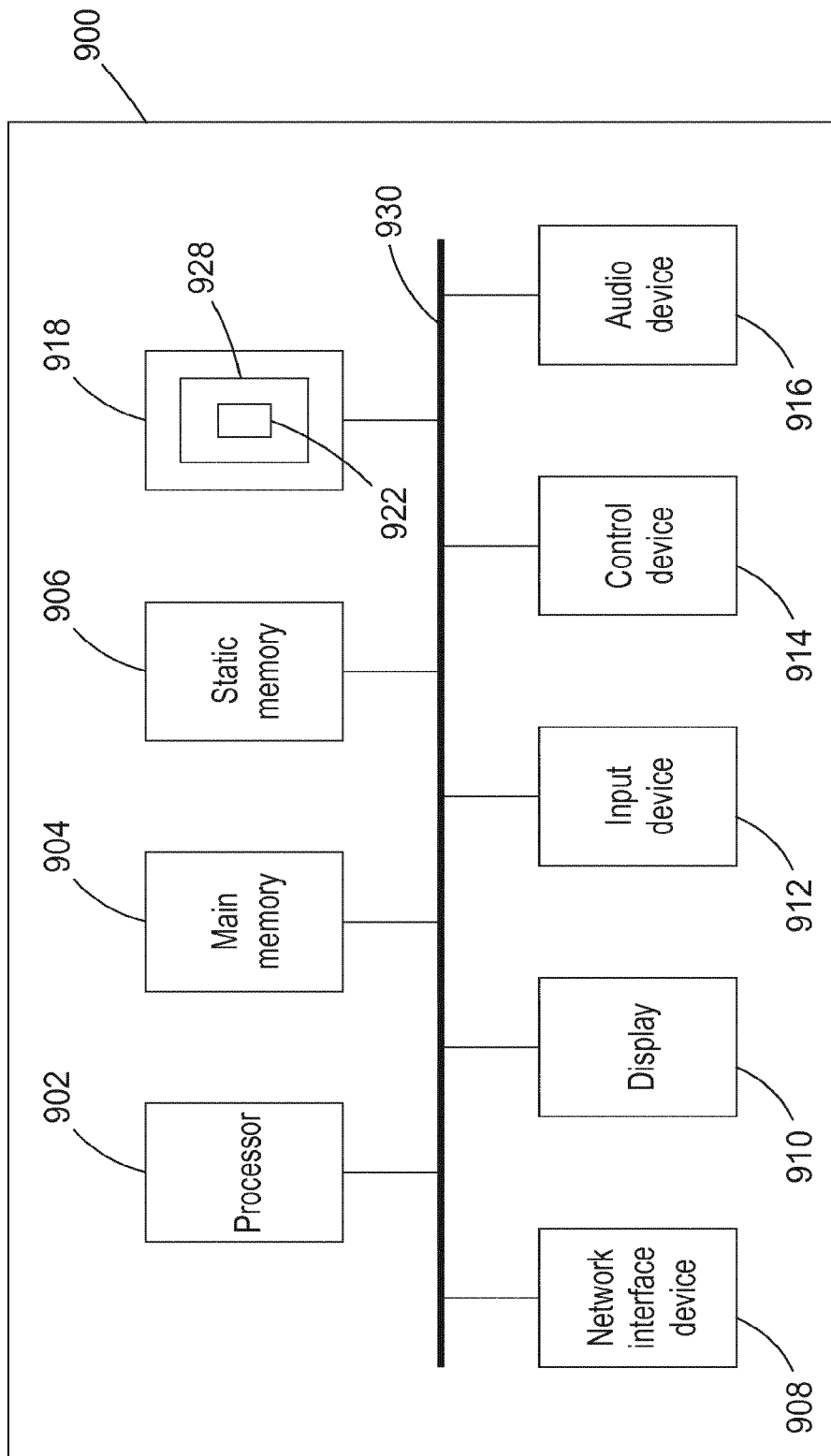
FIG. 9 illustrates a computing device.

FIG. 9 illustrates a block diagram of one implementation of a computing device 900 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 900 includes a processing device 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory (e.g., a data storage device 918), which communicate with each other via a bus 930.

Processing device 902 represents one or more general-purpose processors such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the processing logic (instructions 922) for performing the operations and steps discussed herein.

The computing device 900 may further include a network interface device 908. The computing device 900 also may include a video display unit 910 (e.g., a liquid crystal display (LCD) or a cathode ray tube (CRT)), an alphanumeric input device 912 (e.g., a keyboard or touchscreen), a cursor control device 914 (e.g., a mouse or touchscreen), and an audio device 916 (e.g., a speaker).

The data storage device 918 may include one or more machine-readable storage media (or more specifically one or more non-transitory computer-readable storage media) 928 on which is stored one or more sets of instructions 922 embodying any one or more of the methodologies or functions described herein. The instructions 922 may also reside, completely or at least partially, within the main memory 904 and/or within the processing device 902 during execution thereof by the computer system 900, the main memory 904 and the processing device 902 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hard-wired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "sending", "determining", "comparing", "enabling", "maintaining", "identifying", "combining", "storing", "transmitting", "validating", "updating", "authenticating", "causing", "actioning", "retrieving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A message receiving device comprising:
a memory configured to store a plurality of messages and corresponding message tags;

a communications interface configured to receive a message tag from a message sending device without a corresponding message; and a processor configured to:
combine each message of the plurality of messages with an authentication key to compute, for each message of the plurality of messages, a respective message tag of a plurality of message tags for validating one or more message tags associated with one or more future received messages;
store the plurality of message tags in the memory prior to receiving the message tag from the message sending device;
validate the received message tag based on comparing the received message tag with the stored plurality of message tags to identify a matching message tag;
in response to a trigger event, update the authentication key for computing one or more updated message tags;
combine each message of the plurality of messages with the updated authentication key to compute a plurality of updated message tags; and
store the plurality of updated message tags in the memory.

2. The device of claim 1, wherein the processor is configured to:
store each computed message tag in the memory in association with a corresponding message as a respective message-tag pair; and
in response to identifying the matching message tag, identify a message communicated by the message sending device without receiving the message based on identifying the message from the memory that corresponds to the matching message tag.

3. The device of claim 1, wherein, to combine one message of the plurality of messages with the authentication key, the processor is configured to, at least one of:
encrypt the one message using the authentication key;
hash the one message with the authentication key; or
use the authentication key as a seed or parameter to encode the one message using a Message Authentication Code (MAC) algorithm.

4. The device of claim 1, wherein the trigger event comprises the validation of the message tag.

5. The device of claim 1, wherein the communications interface is configured to transmit a message to the message sending device and the processor is configured to cause the communications interface to send a return message to the message sending device in response to validating the received message tag.

6. The device of claim 5, wherein the return message comprises information enabling authentication of the return message by the message sending device.

7. The device of claim 1, wherein each message comprises a corresponding control instruction for an actuator device associated with the message receiving device and the processor is configured to cause the control instruction to be actioned by the actuator device, or wherein each message comprises a sensor signal of a sensor associated with the message sending device and the processor is configured to process the sensor signal to determine a control instruction for an actuator and to cause the control instruction to be actioned by the actuator.

8. The device of claim 7, wherein the processor is configured to execute the combining, updating and transmitting subsequent to causing the actuator to action the control instruction.

9. A message sending device comprising:
a memory configured to store a plurality of message-tag pairs, each message-tag pair including a respective message from a plurality of messages and respective message tag from a plurality of message tags;
a communications interface configured to transmit message; and
a processor configured to:
combine each message of the plurality of messages with an authentication key to generate, for each message of the plurality of messages, a respective message tag of a plurality of message tags for validating one or more message tags associated with one or more future transmitted messages;
store each computed message tag of the plurality of message tags in the memory in association with a respective message of the plurality of messages as a respective message-tag pair;
select a message to communicate to a message receiving device;
retrieve a message tag from a stored message-tag pair corresponding to the selected message from the memory;
cause the communications interface to transmit the retrieved message tag corresponding to the selected message without the selected message;
in response to a trigger event, update the authentication key for computing one or more updated message tags;
combine each message of the plurality of messages with the updated authentication key to compute a plurality of updated message tags; and
store each updated message tag of the plurality of updated message tags in the memory in association with a respective message of the plurality of messages.

10. The device of claim 9, wherein the processor is configured to cause the communications interface to transmit the retrieved message tag corresponding to the selected message without transmitting the selected message.

11. The device of claim 9, wherein, to combine one message of the plurality of messages with the authentication key, the processor is configured to, at least one of:
encrypt the one message using the authentication key;
hash the one message with the authentication key; or
use the authentication key as a seed or parameter to encode the one message using a Message Authentication Code (MAC) algorithm.

12. The device of claim 9, the communications interface is configured to receive a return message from the message receiving device, wherein the trigger event comprises the receipt, by the communications interface, of a message confirming receipt of the message tag by the message receiving device.

13. A method of receiving a message, the method comprising:
combining each message of a plurality of messages with an authentication key to compute, for each message of the plurality of messages, a respective message tag of a plurality of message tags for validating one or more message tags associated with one or more future received messages;
storing the plurality of messages and the plurality of message tags in a memory;
receiving a message tag from a message sending device without a corresponding message;

validating the received message tag based on comparing the received message tag with the stored plurality of message tags to identify a matching message tag;

in response to a trigger event, updating the authentication key for computing one or more updated message tags;

combining each message of the plurality of messages with the updated authentication key to compute a plurality of updated message tags; and storing the plurality of updated message tags in the memory.

14. The method of claim 13, further comprising:

storing each computed message tag in the memory in association with a corresponding message as a message-tag pair; and in response to identifying the matching message tag, identifying a message communicated by the message sending device without receiving the message based on identifying the message from the memory that corresponds to the matching message tag.

15. The method of claim 13, wherein the trigger event comprises the validation of the message tag.

16. The method of claim 13, wherein, combining one message of the plurality of messages with the authentication key, comprises at least one of:

encrypting the one message using the authentication key;

hashing the one message with the authentication key; or using the authentication key as a seed or parameter to encode the one message using a Message Authentication Code (MAC) algorithm.

17. The method of claim 13, further comprising:

transmitting a return message to the message sending device in response to validating the received message tag.

18. The method of claim 17, the return message comprises information enabling authentication of the return message by the message sending device.

* * * * *